United States Patent [19]

Höfer

[11] Patent Number: 4,817,575
[45] Date of Patent: Apr. 4, 1989

[54] FUEL INJECTION PUMP FOR INTERNAL COMBUSTION ENGINES

[75] Inventor: Gerald Höfer, Bad Aibling, Fed. Rep. of Germany

[73] Assignee: Robert Bosch GmbH, Stuttgart, Fed. Rep. of Germany

[21] Appl. No.: 140,182

[22] Filed: Dec. 31, 1987

[30] Foreign Application Priority Data

Feb. 5, 1987 [DE] Fed. Rep. of Germany ....... 3703438

[51] Int. Cl.$^4$ ............................................. F02M 39/00
[52] U.S. Cl. .................................... 123/506; 123/503; 123/373; 123/458
[58] Field of Search ............... 123/506, 458, 449, 373, 123/503

[56] References Cited

U.S. PATENT DOCUMENTS

| 4,271,808 | 6/1981 | Kodayashi | 123/506 |
| 4,535,742 | 8/1985 | Laufer | 123/506 |
| 4,586,480 | 6/1986 | Kobayashi | 123/506 |
| 4,604,979 | 12/1986 | Kobayashi | 123/458 |
| 4,697,565 | 10/1987 | Kobayashi | 123/506 |
| 4,730,585 | 2/1988 | Abe | 123/506 |

FOREIGN PATENT DOCUMENTS 4586288 3/1981 United Kingdom ................ 123/449

Primary Examiner—Carl Stuart Miller
Attorney, Agent, or Firm—Edwin E. Greigg

[57] ABSTRACT

A fuel injection pump of the distributor pump type having a pump piston driven for simultaneous reciprocation and rotation, the supply quantity of which that is effective for injection is controlled by the opening of a relief conduit of the pump work chamber in that with the aid of a mechanical regulator an annular slide is moved into variable stroke positions on the pump piston. Additionally, for an electronic regulation of the total injection quantity, a pre-stroke (hv) is provided, which is determined by a first valve and which, under the control of a second, electrically controlled valve connected to the output side of the first valve, is added to the basic supply stroke in a variably effective manner in terms of injection. Thus the fuel injection quantity can be regulated within the context of the fuel injection quantity difference resulting from the pre-stroke.

19 Claims, 3 Drawing Sheets

FUEL INJECTION PUMP FOR INTERNAL COMBUSTION ENGINES

BACKGROUND OF THE INVENTION

The invention is based on a fuel injection pump for internal combustion engines. A fuel injection pump of this kind, known from German Offenlegungsschrift No. 26 44 698, has a first and a second relief conduit, both of which extend in the pump piston and at the pump piston circumference discharge inside the suction chamber of the fuel injection pump. The mouths of the relief conduits are disposed offset in terms of the stroke, or in other words are opened in a staggered manner by a control edge of the annular slide in the course of the pump piston stroke. Only the first relief conduit communicates directly with the pump work chamber. During an initial portion of the stroke, that is, the pre-stroke hv, of the pump piston, the second relief conduit communicates with the pump work chamber via the first pump piston valve, which is embodied by an annular groove in the pump cylinder wall and a second outlet opening of the first relief conduit. On its other end, the second relief conduit communicates with the suction chamber, in all the operating ranges except during engine starting. During starting, the outlet of the second relief conduit is closed by the annular slide, which thus forms the second valve, when it is put into the starting position. For starting the internal combustion engine driven with the fuel injection pump, the apparatus furnishes a structurally dictated constant fuel injection quantity over the course of the prestroke hv.

OBJECT AND SUMMARY OF THE INVENTION

The fuel injection pump according to the invention has an advantage over the prior art that a supplemental fuel injection quantity, which is electrically controlled, can be superimposed for regulating purposes upon a variable basic fuel injection quantity which is regulated by a known mechanical fuel injection quantity regulator. Thus, the fuel injection quantity effectively supplied by the fuel injection pump can be adapted to the special characteristic curves of the engine involved, both with respect to the full-load injection quantity and to the breakaway characteristic when the maximum idling rpm of the engine is attained. In an adaptation to special operating conditions, the fuel quantity can also be adapted as a function of external pressure or charge pressure, or of temperature, and in particular to the requirements in cold starting and the warmup phase. For particularly sensitive quantity control, the fuel quantity can also be controlled as a function of a bucking correction signal and/or a quiet-idling correction signal. Apparatuses for forming such signals are known.

This invention has an advantage that at little expense, exact regulation of the fuel injection quantity can be attained in a Diesel injection pump, with all the advantages of electric regulation, and on the other hand in the event the electric regulation fails, safe emergency operation of the engine is possible with only a slight decrease in power. In particular, the mechanical regulation protects the engine from damage if electronic regulation fails. The adjustment of the injection onset toward "early" that results from adding the initial additional fuel injection quantity can be corrected by adjusting the injection onset in a known manner, by measuring the additional fuel quantity.

In an advantageous feature of the invention, a principle according to the invention is applied to a fuel injection pump that operates with control of the end of supply. In another feature, it is also possible to use electrically controlled valves that are not pressure-balanced or are not safe under high pressure for controlling the effective injection during the pre-stroke length of the pump piston. In a further development of this feature, intake grooves are advantageously used for effecting communication of the valve element, embodied by the annular groove, of the first valve with the pump work chamber.

In another feature of the invention, the idle volume in the high-pressure circuit is reduced to a minimum. Another feature of the invention offers a substantial advantage that an additionally imposed fuel injection quantity as well as the basic fuel injection quantity that is controllable by the mechanical regulator can be detected exactly, enabling exact regulation of the actual injection quantity. To this end, the parameters recited herein can be taken into account. In particular, features set forth provide an advantage that a shift of the fuel injection onset toward "early" resulting from an additional fuel injection quantity can be corrected again by an injection onset regulating device known per se. For cold starting, a shift of the instant of injection toward "early" is desirable in any case, and now results automatically because of the increase in fuel quantity attained via the pre-stroke. This is also advantageous, because the injection adjustment range in which the actual injection adjuster functions can be kept narrow.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
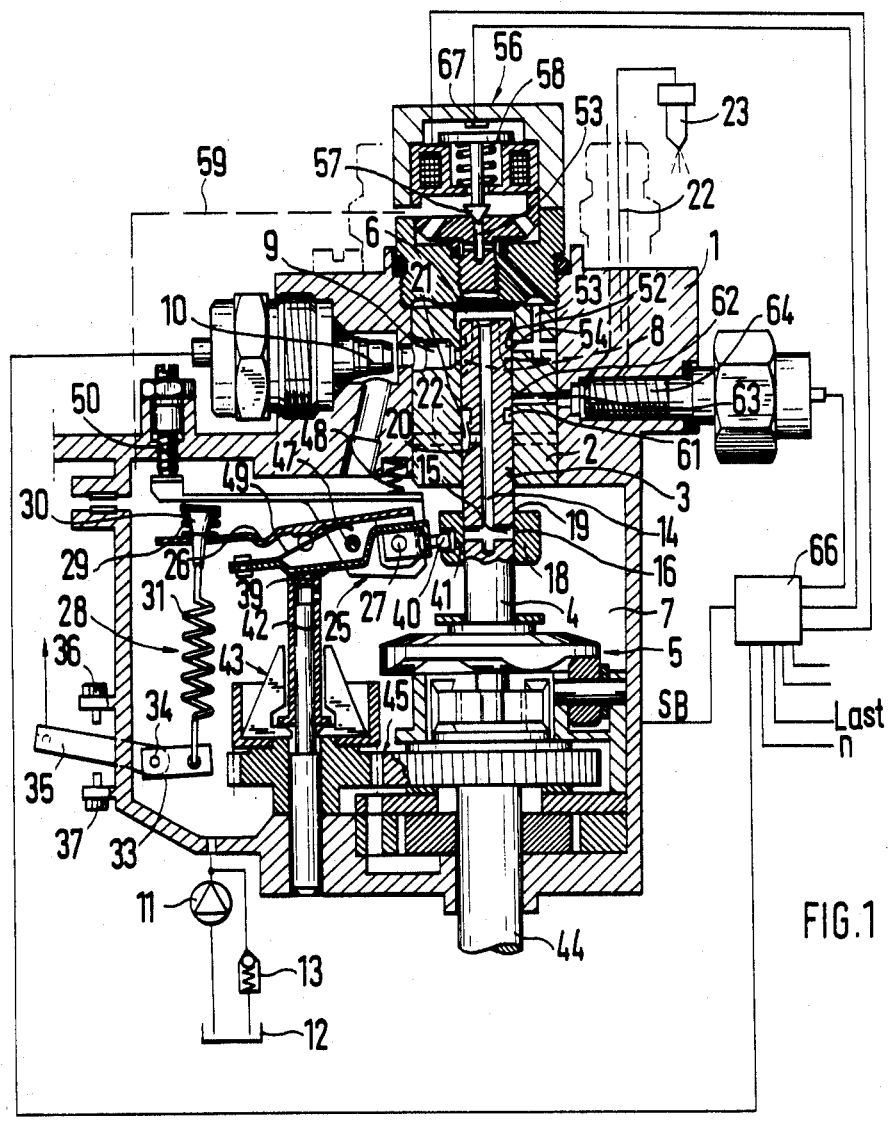
FIG. 1 shows a first exemplary embodiment of the invention, having an electrically control second valve connected to an output side of the first valve.

A bushing 2 is disposed in a housing 1 of a fuel injection pump shown in FIG. 1. In an inner bore, of this bushing 2, a pump cylinder 3 is formed, a pump piston 4 executes a simultaneously reciprocating and rotation motion in the pump cylinder driven by a cam drive 5. On one face end, the pump piston encloses a pump work chamber 6 and the other end protrudes partway out of the pump cylinder into a pump suction chamber 7, which is enclosed in the housing 1.

As long as the pump piston is executing its intake stroke or assumes its bottom dead center position, the pump work chamber 6 is supplied with fuel, via longitudinal grooves, serving as intake grooves 8, disposed in the jacket face of the pump piston and via a suction line 9 which originates at the pump suction chamber 7, passes radially through the bushing 2 and extends within the housing 1. For shutting off the fuel supply to the pump work chamber, a magnetic shutoff valve 10 is disposed in the suction line 9; when this valve 10 is excited, it closes the suction line 9. The pump suction chamber is supplied with fuel from a fuel tank 12 via a feed pump 11. By means of a pressure control valve 13, the pressure is typically controlled in accordance with rpm in the pump suction chamber in a known manner, so as to enable making an rpm-dependent injection adjustment, for example hydraulically, via this pressure controlled as a function of rpm. The injection adjuster engages the cam drive 5 in a known manner, not shown in detail here. With increasing rpm, the stroke onset of the pump piston is adjusted to "early" in a known manner.

In the pump piston, a longitudinal conduit 14, which is embodied as a blind bore and serves as a relief conduit, leads away from the pump work chamber 6. Branching off from the conduit 14 is a transverse bore 15, which leads to a first outlet opening 16 on the circumference of the pump piston 4, in a region in which the pump piston protrudes into the suction chamber 7. The outlet openings 16 are preferably diametrically opposite one another, which leads to a balanced hydraulic load on the pump piston. Disposed on the pump piston in this region is a quantity adjusting device in the form of an annular slide 18, which is displaceable tightly on the pump piston and with its upper face end forms a control edge 19, by means of which the outlet openings 16 are controlled.

Also branching off from the relief conduit 14 between the work chamber and the transverse bore 15 is a radial bore 20, which leads to a distributor opening 21 in the form of a longitudinal groove on the circumference of the pump piston. In the operating region of this distributor opening, pressure lines 22 branch off from the pump cylinder 3 in a radial plane, which are equally distributed on the circumference of the pump cylinder in accordance with the number of cylinders of the associated engine that are to be supplied with fuel. The pressure lines lead via one injection nozzle 23 each to the cylinders of the engine that are to be supplied. As soon as the suction line 9 is closed by the jacket face of the pump piston, at the onset of the supply stroke of the pump piston following a corresponding rotation of the pump piston, the fuel located in the pump work chamber 6 is pumped to these injection nozzles via the relief conduit 14, the radial bore 20 and the distributor groove 21. This pumping is interrupted whenever the outlet openings 16, in the course of the pump piston stroke, are opened by the annular slide 18 and come into communication with the suction chamber 7. From that point on, the remaining fuel positively displaced by the pump piston is pumped only into the suction chamber. The higher the level at which the annular slide 18 is adjusted toward the pump work chamber, the greater the quantity of fuel pumped by the pump piston.

A fuel injection quantity regulator 25 provided for the adjustment of the annular slide 18 has a tensioning lever 25, which is pivotable about a shaft 27, has one arm, and is coupled at its lever arm end to a governor spring assembly 28. This assembly comprises an idling spring 29 disposed between the head of a coupling element 30 and the tensioning lever; the coupling element is passed through an opening in the tensioning lever, and at its other end, remote from the head, it is connected to a main governor spring 31. The main governor spring 31, in turn, is suspended at one end from a pivot arm 33, which is adjustable with the aid of an adjusting lever 35, via a shaft 34 which passes through the pump housing. The adjusting lever is arbitrarily actuatable between an adjustable full-load stop 36 and an adjustable idling stop 37 by a person operating it and in accordance with the example given is actuated in accordance with the torque desired. Instead of the simple helical spring shown here as the main governor spring, it is naturally also possible to use other governor spring assemblies that are of the multistage and/or prestressed type.

A starting lever 39 is also pivotable about the shaft 27; it is two-armed, and with one arm, via a ball head 40, engages a groove 41 in the annular slide 18 and serves to adjust this annular slide. The other arm of the starting lever has a leaf spring 49, which as the starting spring is braced against the tensioning lever 26 by being spread open against it. Acting upon this particular lever arm of the starting lever 39 is also the final control element 42 of an rpm transducer in the form of a flyweight control assembly 43 of a known type, which is driven synchronously with the drive shaft 44, which also drives the cam drive 5, of the fuel injection pump, via a gear train 45. With increasing rpm, the final control element 42, along with the starting lever 39 and the annular slide 18, is accordingly displaced counter to the force of the starting spring 49, until the starting spring comes to rest on the tensioning lever. In this process, the annular slide is adjusted away from a highest position, nearest the pump work chamber and corresponding to a starting quantity setting, toward the pump piston drive side, thus reducing the increased starting quantity. Once the starting lever comes to rest on the tensioning lever, both levers become pivotable counter to the force of the idling spring 29, until the main governor spring 31 comes into action, adjacent the idling range. For adjustment, the shaft 27 is supported on an adjusting lever 26, which is pivotable about a shaft 47 attached to the housing and is kept in contact with an adjustable stop 50 by a spring 48.

To the extent described thus far, the fuel injection pump is equivalent to a standard, known version. In a further version, an annular groove 52 is now provided in the jacket face of the pump piston 4, in the vicinity of the intake grooves 8; this annular groove 52 cooperates with a connecting conduit 53 leading away from the pump cylinder 3. These two elements, the annular groove and the outlet opening 54 of the connecting conduit 53 on the pump cylinder 3, form a first valve, by way of which, at a corresponding stroke position of the pump piston, communication is established between the pump work chamber 6 and the connecting conduit 53. Instead of this arrangement, the annular groove can also be provided in the pump cylinder wall, if the first valve is embodied as a pairing of an annular groove with an outlet opening, or as a pairing of an annular groove with an annular groove. The connecting conduit 53 leads on to a second valve 56, in the form of a magnetic valve of known type. The connection conduit 53 is monitored there by the closing element 57 of the magnetic valve and is closed upon excitation of the magnet. Acting in the opening direction is a spring 58 on the valve closing member, which member in the open position, when the electromagnet is not excited, connects the connecting conduit 53 with the suction chamber 7, or some other relief chamber, via a line 59. The annular groove 52 communicates via the intake grooves 8 with the pump work chamber 6 and is disposed such that it does not come into direct communication with the inlet opening of the intake line 9. The communication with the outlet opening 54 of the connecting conduit 53 remains in force over a stroke distance of the fixedly predetermined length $h_{vmax}$, beginning at the pump piston supply onset. Only from this stroke on, when the second valve 56 is opened, can fuel be put under high pressure in the pump work chamber and attain injection. In addition to this pumped quantity, a remaining pre-stroke $h_{ve}$, which is a portion of the entire pre-stroke $h_{vmax}$, also becomes effective in terms of injection, subsequent to the execution of a partial pre-supply stroke $h_{va}$ that is not effective in terms of injection; this event depends upon when the second valve 56 closes after the stroke onset, during the pre-stroke distance $h_{vmax}$. The closing point of the second valve accordingly determines the magnitude of an additional fuel injection quantity, which is added to the injection quantity that is controlled following the closure of the first valve 54, 53 by the mechanical regulator 25.

Figure 2:
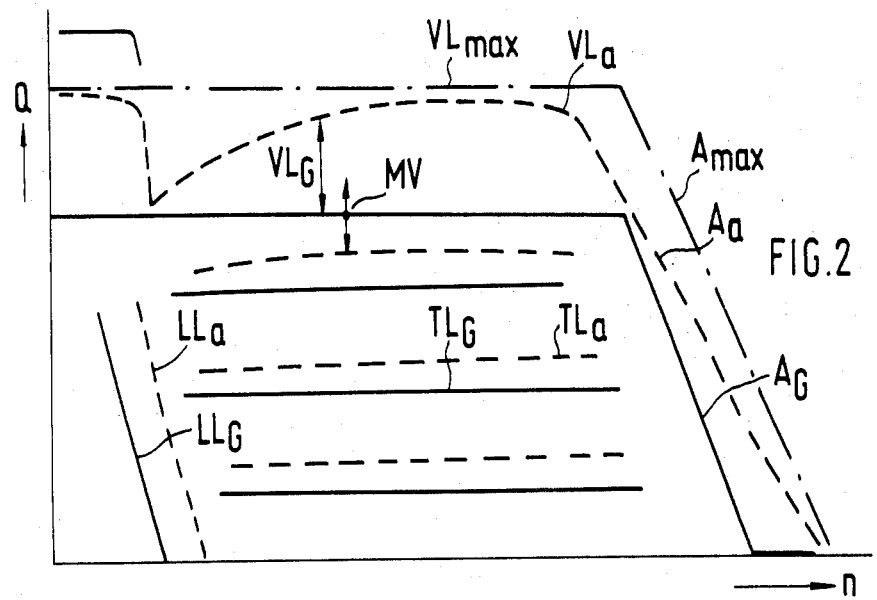
FIG. 2 is a diagram in which the fuel injection quantity is plotted over the rpm, showing the characteristic curves attainable.

These relationships are shown in FIG. 2, in the performance graph diagram in which fuel quantities are plotted over rpm. The solid lines indicate the injection quantities that, depending on the control outcome of the mechanical governor 25, result when the second valve 56 is continuously open. These are the full-load characteristic curve $VL_G$, the partial-load characteristic curves $TL_G$, the idling characteristic curve $LL_G$ and the breakaway characteristic curve $A_G$. The dot-dash lines $VL_{max}$ and $A_{max}$ indicate the situation in which the second valve 56 is continuously closed. Between these two extreme values, an arbitrary characteristic curve course can be achieved, by variable control of the second valve 56 and by appropriate triggering of the second magnetic valve by means of a control unit 66. The result then is characteristic curves that approximate the actual needs of the engine as closely as possible. These are, for example, the full-load characteristic curve $VL_a$, the idling characteristic curve $LL_a$, or the partial-load characteristic curve $TL_a$. The breakaway curve $A_a$, too, can be adapted to the corresponding needs.

The appropriate correction can be performed by means of the control unit 66, for example via a performance graph as a function of the rpm and the load. The control device 66 also controls the magnetic shutoff valve 10 in a known manner. In particular, however, the desired fuel injection quantity can also be regulated, by measuring the additional fuel quantity attaining injection during the pre-stroke. This is done, first, by detecting the position of the valve closing member 57 of the second valve 56, with the aid of a closing-point and/or opening-point transducer 67 of a known type. A second annular groove 61 that communicates continuously with the pump work chamber can also be provided on the pump piston. Cooperating with this second annular groove 61 is a contact opening 62 in the wall of the pump cylinder 3. The contact opening communicates via a line 63 with a pressure sensor 64, the output signals of which are supplied to the control unit 66. The second annular groove 61 comes into communication with the contact opening 62 at the stroke onset.

Figure 3:
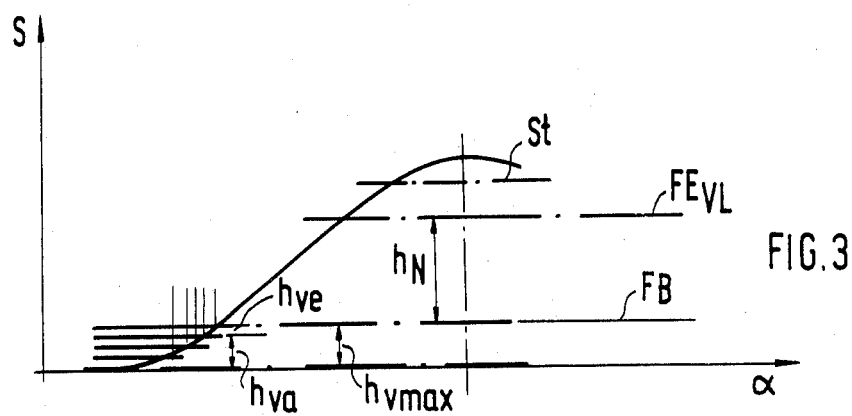
FIG. 3 shows a piston stroke curve, which explains the switching times of the second valve.

The above-described control principles, which are also the basis for feedback signals to the control unit, are illustrated in FIG. 3. There the pump piston elevation curve, or the cam course, is plotted over the rotational angle $\alpha$. The diagram includes a supply onset line $F_B$ parallel to the abscissa and spaced apart from it by the pre-stroke $h_{vmax}$; a line $FE_{VL}$, parallel to $F_B$ and spaced apart from it by the useful stroke $h_N$, which characterizes the end of fuel supply at full load; and a line $S_t$, parallel to the others and spaced apart from $FE_{VL}$ by the starting quantity stroke, which represents the pump piston supply stroke that is effective for injection in the case of starting.

From FIG. 3, it is apparent that with an increasing length of the pre-stroke $h_{ve}$ that is effective for injection, the injection onset is shifted toward "early". This is advantageous when increasing the starting quantity for a cold start, because an earlier injection onset is regularly needed in connection with the cold start. In an engine that has warmed up to operating temperature, this shift toward "early" can also be corrected and compensated for by causing appropriate correction of the injection onset to be performed by the injection onset adjusting device associated with the cam drive 5. To this end, the injection adjusting device is advantageously, and in a known manner, electrically controlled by a correction signal of the control unit 66. To detect the extent of the shift toward "early" effected by the increase in the quantity, the fuel injection pump is advantageously provided with a closing- and/or opening-point transducer 67. With it, the proportion of the portion $h_{ve}$ of the total prestroke $hv_{max}$ that is effective in terms of injection is detected. The additional fuel quantity imposed, and the shift to early, are thus detected at the same time as well. The result is a feedback of the aforementioned quantity correction, such that regulation is attainable. Naturally the additional first fuel injection quantity can also be measured in some other known manner, such as with the aid of a needle stroke transducer in the injection valve 23. The disposition of the pressure sensor 64 provides another possible way of detecting the portion of the pre-stroke that is effective in injection. As long as the second valve 56 is still open, a pressure that corresponds to a transfer pressure reaches the pressure sensor, after the second annular groove 61 has come into coincidence with the contact opening 62. This pressure is the pressure that is established in the pump work chamber 6 as long as this chamber is relieved via the connecting conduit 63. Accordingly, the pressure sensor emits a first signal. Because of throttling, this pressure is higher than the suction chamber pressure 7 but lower than the injection pressure. If the second valve 56 now closes, high pressure corresponding to the injection pressure is then produced in the pump work chamber, and this pressure is then detected by the pressure sensor as well, which emits a second signal. From the interval between the first signal, corresponding to the transfer pressure, and the second signal, the idling stroke $h_{va}$ can be detected, and by relating it with the structurally dictated maximum pre-stroke $h_{vmax}$, the additional fuel quantity that is effective for injection can be detected via the pre-stroke $h_{ve}$ that is effective for injection.

Figure 4:
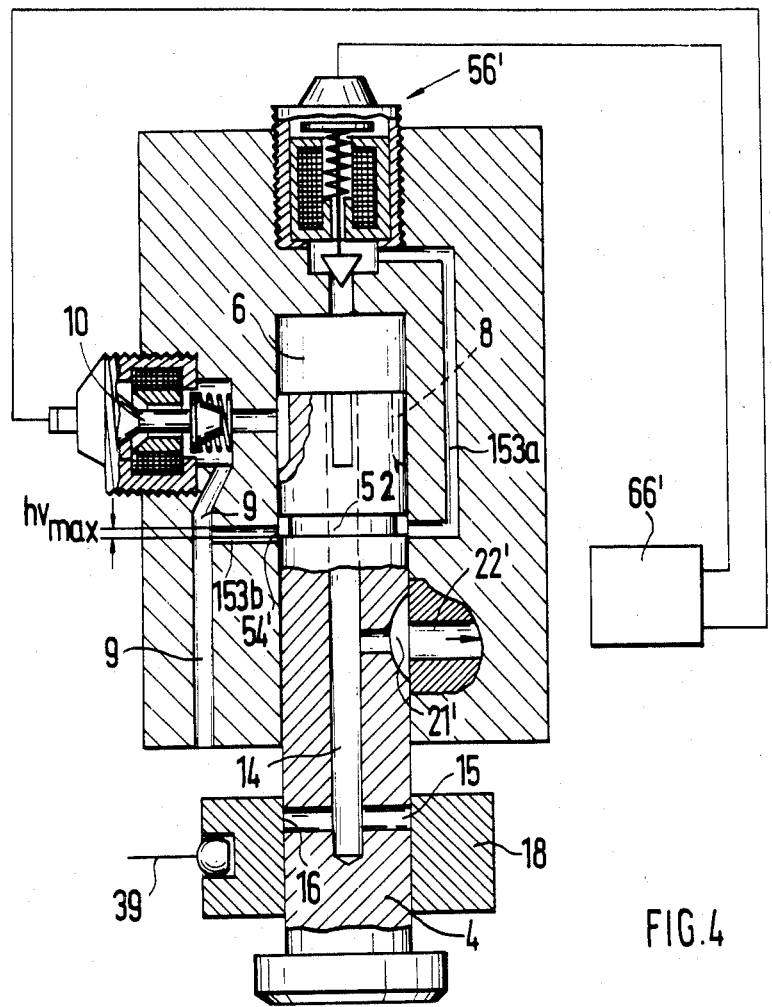
FIG. 4 shows a second exemplary embodiment of the device having a second, electrically controlled, valve connected to the input side of the first valve.

In the above exemplary embodiment, the second valve 56 is mounted as a closing element on the face-end side of the bushing 2 and closes the pump work chamber 6. A magnet valve disposed centrally in this way is particularly advantageous in a distributor injection pump, in which the individual pressure lines 22 leading away from the housing to the injection valves 23 are distributed around the magnetic valve 56. With this arrangement, the second magnetic valve is also disposed downstream of the first valve, that is, the valve embodied by the first annular groove 52 and the outlet opening 54. This is necessary because the valve provided here is not pressure-balanced, and must not be exposed continuously to high pressure. The result is a somewhat larger idle volume during the initial phase of fuel supply. In a departure from this, the second valve 56' in the exemplary embodiment shown in FIG. 4 is disposed upstream of the first valve. Here an annular groove 52' in the pump piston 4' is provided that does not communicate directly with the pump work chamber 6. Communicating with the annular groove 52', at least over the entire pre-stroke $hv_{max}$, is the connecting conduit 153a. This conduit effectively discharges into the pump work chamber 6, and directly before where it discharges into the pump work chamber it has a magnetic valve 56', corresponding to the magnetic valve 56 of FIG. 1. However, this valve must be high-pressure-proof, because in emergency operation, that is, in the event the regulation fails, the valve is opened and is continuously exposed to the high pressure during the supply phase of the pump piston. As in the exemplary embodiment of FIG. 1, the first valve is again embodied by a pairing of an annular groove and an outlet opening; the annular groove 52' controls the outlet opening 54' of the portion 153b of the connecting conduit that leads from the pump cylinder 3 to the relief side, or to the suction line 9. The annular groove 52' is put in communication with this portion 153b at the stroke onset and is separated from it after $hv_{max}$. Otherwise, the fuel injection pump of FIG. 4 is identical in embodiment to that of FIG. 1. Functionally as well, it can be described as set forth above for the first exemplary embodiment. As in that case, the fuel injection pump is controlled by a control unit 66.

With the embodiments described above, a fuel injection pump having an electronic regulating device is particularly attained, at lesser cost while maintaining safety, because emergency operation is possible with a basic fuel injection quantity, with the aid of the mechanical regulator. The electronic regulator has all the advantages that are attainable only in a fuel injection pump that is electronically regulatable. The mechanical regulator may also be embodied in some other known manner, for instance as a hydraulic regulator.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A fuel injection pump for internal combustion engines having a housing, a cylinder in said housing, a pump piston (4) driven to reciprocate and simultaneously rotate in said pump cylinder (3) and thereby serving as a fuel distributor, a pump work chamber (6) in the pump cylinder defined by said piston, which during a fuel supply stroke of the pump piston is made to communicate in succession, via one of a plurality of pressure lines (22) to a fuel injection valve (23), longitudinal intake grooves (8) disposed on the pump piston adjacent said work chamber, for communication during each intake stroke of the pump piston with a suction line (9) extending from a fuel-filled suction chamber (7) in said housing to said pump cylinder and said pump work chamber for controlling a fuel supply that is effective for injection during a supply stroke being permanently connected to a relief conduit (14) in said piston which discharges via an outlet opening (16) into the suction chamber (7), an annular slide (18) including a control edge (19) for controlling fuel injection controls discharge of fuel via said outlet opening in combination with the pump piston motion, a mechanical fuel injection quantity regulator (25) which adjusts said annular slide relative to said pump piston, a connecting conduit (53) which contains a first valve (52, 54) disposed between the pump work chamber (6) and a relief chamber, said connecting conduit (53) is opened at an onset of a supply stroke of said pump piston by said first valve (52, 54) and is closed after a predetermined stroke ($h_v$) of the pump piston and an electrically controlled second valve (56) provided in series with said first valve, said second valve being opened at a supply stroke onset and closable by an electric control unit as a function of operating parameters for a variably long time during the opening time of the first valve.

2. A fuel injection pump for internal combustion engines having a housing, a cylinder in said housing, a pump piston (4) driven to reciprocate and simultaneously rotate in said pump cylinder (3) and thereby serving as a fuel distributor, a pump work chamber (6) in the pump cylinder defined by said piston, which during a fuel supply stroke of the pump piston is made to communicate in succession, via one of a plurality of pressure lines (22) to a fuel injection valve (23), longitudinal intake grooves (9) disposed on the pump piston adjacent said work chamber, for communication during each intake stroke of the pump piston with a suction line (9) extending from a fuel-filled suction chamber (7) in said housing to said pump cylinder and said pump work chamber for controlling a fuel supply that is effective for injection during a supply stroke being permanently connected to a relief conduit (14) in said piston which discharges via an outlet opening (16) into the suction chamber (7), an annular slide (18) including a control edge (19) for controlling fuel injection controls discharge of fuel via said outlet opening in combination with the pump piston motion, a mechanical fuel injection quantity regulator (25) which adjusts said annular slide relative to said pump piston, a connecting conduit (53) which contains a first valve (52, 54) disposed between the work pump chamber (6) and a relief chamber, said connecting conduit (53) is controlled by said first valve (52, 54) and is closed beyond a predetermined stroke of the pump piston and an electrically controlled second valve (56) provided in series with said first valve, said second valve being closable by an electric control unit as a function of operating parameters for a variably long time during the opening time of the first valve, and said first valve (52, 54) is disposed in a relief direction upstream of said second valve (56) and comprises a pairing of an annular groove (52) and an outlet opening on said pump piston (4) and said pump cylinder in which that part of said annular groove and said outlet opening that is provided on the pump piston is in continuous communication with the pump work chamber (6).

3. A fuel injection pump for internal combustion engines having a housing, a cylinder in said housing, a pump piston (4) driven to reciprocate and simultaneously rotate in said pump cylinder (3) and thereby serving as a fuel distributor, a pump work chamber (6) in the pump cylinder defined by said piston, which during a fuel supply stroke of the pump piston is made to communicate in succession, via one of a plurality of pressure lines (22) to a fuel injection valve (23), longitudinal intake grooves (8) disposed on the pump piston adjacent said work chamber, for communication during each intake stroke of the pump piston with a suction line (9) extending from a fuel-filled suction chamber (7) in said housing to said pump cylinder and said pump work chamber for controlling a fuel supply that is effective for injection during a supply stroke being permanently connected to a relief conduit (14) in said piston which discharges via an outlet opening (16) into the suction chamber (7), an annular slide (18) including a control edge (19) for controlling fuel injection controls discharge of fuel via said outlet opening in combination with the pump piston motion, a mechanical fuel injection quantity regulator (25) which adjusts said annular slide relative to said pump piston, a connecting conduit (53) which contains a first valve (52, 54) disposed between the work pump chamber (6) and a relief chamber, said connecting conduit (53) is opened at an onset of a supply stroke of said pump piston by said first valve (52, 54) and is closed after a predetermined stroke ($h_v$) of the pump piston and an electrically controlled second valve (56) provided in series with said first valve, said second valve being closable by an electric control unit as a function of operating parameters for a variably long time during the opening time of the first valve, and said first valve (52, 54) is disposed in a relief direction upstream of said second valve (56) and comprises a pairing of an annular groove (52) and an outlet opening on said pump piston (4) and said pump cylinder in which that part of said annular groove and said outlet opening that is provided on the pump piston is in continuous communication with the pump work chamber (6).

4. A fuel injection pump for internal combustion engines having a housing, a cylinder in said housing, a pump piston (4) driven to reciprocate and simultaneously rotate in said pump cylinder (3) and thereby serving as a fuel distributor, a pump work chamber (6) in the pump cylinder defined by said piston, which during a fuel supply stroke of the pump piston is made to communicate in succession, via one of a plurality of pressure lines (22) to a fuel injection valve (23), longitudinal intake grooves (8) disposed on the pump piston adjacent said work chamber, for communication during each intake stroke of the pump piston with a suction line (9) extending from a fuel-filled suction chamber (7) in said housing to said pump cylinder and said pump work chamber for controlling a fuel supply that is effective for injection during a supply stroke being permanently connected to a relief conduit (14) in said piston which discharges via an outlet opening (16) into the suction chamber (7), an annular slide (18) including a control edge (19) for controlling fuel injection controls discharge of fuel via said outlet opening in combination with the pump piston motion, a mechanical fuel injection quantity regulator (25) which adjusts said annular slide relative to said pump piston, a connecting conduit (53) which contains a first valve (52, 54) disposed between the pump work chamber (6) and a relief chamber, said connecting conduit (53) is controlled by said first valve (52, 54) and is closed beyond a predetermined stroke of the pump piston and an electrically controlled second valve (56) provided in series with said first valve, said second valve being closable by an electric control unit as a function of operating parameters for a variably long time during the opening time of the first valve, and said first valve (52', 54') is disposed in a relief direction downstream of said second valve (56') and comprises a pairing of an annular groove and an outlet opening on the pump piston (4) and pump cylinder (3), of which the part of the pair that is provided on the pump piston (4) is in continuous communication with a portion of the connecting conduit (153) that contains the second valve (56').

5. A fuel injection pump for internal combustion engines having a housing, a cylinder in said housing, a pump piston (4) driven to reciprocate and simultaneously rotate in said pump cylinder (3) and thereby serving as a fuel distributor, a pump work chamber (6) in the pump cylinder defined by said piston, which during a fuel supply stroke of the pump piston is made to communicate in succession, via one of a plurality of pressure lines (22) to a fuel injection valve (23), longitudinal intake grooves (8) disposed on the pump piston adjacent said work chamber, for communication during each intake stroke of the pump piston with a suction line (9) extending from a fuel-filled suction chamber (7) in said housing to said pump cylinder and said pump work chamber for controlling a fuel supply that is effective for injection during a supply stroke being permanently connected to a relief conduit (14) in said piston which discharges via an outlet opening (16) into the suction chamber (7), an annular slide (18) including a control edge (19) for controlling fuel injection controls discharge of fuel via said outlet opening in combination with the pump piston motion, a mechanical fuel injection quantity regulator (25) which adjusts said annular slide relative to said pump piston, a connecting conduit (53) which contains a first valve (52, 54) disposed between the pump work chamber (6) and a relief chamber, said connecting conduit (53) is opened at an onset of a supply stroke of said pump piston by said first valve (52, 54) and is closed after a predetermined stroke of the pump piston and an electrically controlled second valve (56) provided in series with said first valve, said second valve being closable by an electric control unit as a function of operating parameters for a variably long time during the opening time of the first valve, and said first valve (52', 54') is disposed in a relief direction downstream of said second valve (56') and comprises a pairing of an annular groove and an outlet opening on the pump piston (4) and pump cylinder (3), of which the part of the pair that is provided on the pump piston (4) is in continuous communication with a portion of the connecting conduit (153) that contains the second valve (56').

6. A fuel injection valve as defined by claim 2, in which said annular groove (52) is disposed on the circumference of said piston and communicates via said longitudinal intake grooves (8) with the pump work chamber (6), and the outlet opening is the outlet of the connecting conduit (53) from the pump cylinder (3), which contains the second valve (56).

7. A fuel injection pump as defined by claim 3, in which said annular groove (52) is disposed on the circumference of said piston and communicates via said longitudinal intake grooves (8) with the pump work chamber (6), and the outlet opening is the outlet of the connecting conduit (53) from the pump cylinder (3), which contains the second valve (56).

8. A fuel injection pump as defined by claim 7, in which said annular groove (52') is disposed on the pump piston circumference.

9. A fuel injection pump as defined by claim 6, in which said second valve is secured to the housing (1) of the fuel injection pump on the face end toward the pump cylinder (3).

10. A fuel injection valve as defined by claim 9, in which said second valve (56') is pressure-proof and is located directly at an outlet of a connecting conduit (153a) out of the pump work chamber (6).

11. A fuel injection pump as defined by claim 10, in which said second valve is opened at the supply stroke onset.

12. A fuel injection pump as defined by claim 1, in which said second valve is provided with a closing- and/or opening-point recognition device (67), an output signal of which serves as a feedback signal for ascertaining an actual fuel injection quantity during a prestroke (hv) of the pump piston supply stroke.

13. A fuel injection pump as defined by claim 1, which includes a pressure sensor (64) which has a contact opening (62) in the pump cylinder wall, which opening is subjected, via a second annular groove (61) on the pump piston circumference that communicates with the pump work chamber (6), at the supply stroke onset of the pump piston to the pressure prevailing in the pump work chamber, and thereby emits a first signal (reference signal) in accordance with a low pump work chamber pressure, which pressure is established during a relief via said connecting conduit (53), and emits a second signal corresponding to an injection pressure when the connecting conduit (53) is closed, wherein an actual additional fuel injection quantity is detected by the electronic control unit from the first signal and a second signal, compared with a set-point value, and regulated to this set-point value.

14. A fuel injection pump as defined by claim 12, which includes a pressure sensor (64) which has a contact opening (62) in the pump cylinder wall, which opening is subjected, via a second annular groove (61) on the pump piston circumference that communicates with the pump work chamber (6), at the supply stroke onset of the pump piston to the pressure prevailing in the pump work chamber, and thereby emits a first signal (reference signal) in accordance with a low pump work chamber pressure, which pressure is established during a relief via said connecting conduit (53), and emits a second signal corresponding to an injection pressure when the connecting conduit (53) is closed, wherein an actual additional fuel injection quantity is detected by the electronic control unit from the first signal and a second signal, compared with a set-point value, and regulated to this set-point value.

15. A fuel injection pump as defined by claim 13, in which said first and second valve controls an additional fuel injection quantity that is controllable as a function of the starting conditions of the engine.

16. A fuel injection pump as defined by claim 13, in which said additional fuel quantity that is controllable by the first and second valve is controlled as a function of the full-load operating conditions in accordance with the engine needs, and in particular also as a function of the pressure of the air supplied to the combustion chambers and/or as a function of the temperature.

17. A fuel injection pump as defined by claim 16, in which said additional fuel injection quantity is adjustable as a function of a desired breakaway characteristic in the maximum idling rpm range.

18. A fuel injection pump as defined by claim 16, in which said additional fuel injection quantity is controllable as a function of a bucking correction signal and/or a quiet-idling correction signal.

19. A fuel injection pump as defined by claim 16, in which the onset of injection is corrected via the detection of the additional fuel injection quantity with a electrically controlled injection onset regulating device.

* * * * *